United States Patent [19]

McLaughlin

[11] Patent Number: 5,165,788

[45] Date of Patent: Nov. 24, 1992

[54] SHIELD FOR A SMALL LAMP

[75] Inventor: Donald D. McLaughlin, Austin, Tex.

[73] Assignee: Lucifer Lighting Company, San Antonio, Tex.

[21] Appl. No.: 745,867

[22] Filed: Aug. 16, 1991

[51] Int. Cl.⁵ ............................................. F21V 17/00
[52] U.S. Cl. ..................... 362/375; 362/310; 362/373; 362/455
[58] Field of Search ............... 362/310, 362, 373, 360, 362/374, 375, 455, 376

[56] References Cited

U.S. PATENT DOCUMENTS

| | | | |
|---|---|---|---|
| 2,338,077 | 12/1943 | Scribner | 362/218 |
| 3,215,828 | 11/1965 | Bonvallet et al. | 362/218 |
| 4,535,393 | 8/1985 | Aspenwall | 362/217 |
| 4,628,421 | 12/1986 | Saar | 362/238 |
| 4,748,545 | 5/1988 | Schmitt | 362/219 |
| 4,763,233 | 8/1988 | Poyer | 362/375 X |
| 5,032,956 | 7/1991 | Park | 362/375 X |

Primary Examiner—Stephen F. Husar
Attorney, Agent, or Firm—Gunn Lee & Miller

[57] ABSTRACT

A cover (70) for a small lamp, the cover having a flat, ring-shaped member (16) with locking legs (28) projecting vertically downward from the underside (26) of the ring (18) for locking into notches in the base (62) of the lamp. The ring-shaped member (18) has locking upright members (24) which project vertically from the top surface (22) thereof, which hold a glass shield (20) in place and which receive on the upper portions thereof a locking ring member (16).

10 Claims, 2 Drawing Sheets

5,165,788

SHIELD FOR A SMALL LAMP

FIELD OF THE INVENTION

This invention relates to small electric lamps, more specifically, a shield for small electric lamps the shield being easily removed from the lamp, without tools, and providing for ventilation between the lamp body and the cover.

BACKGROUND

Small lamps have become very popular recently. They are generally several inches in diameter, have a low profile (thickness), and are usually powered by a 12-volt A.C. transformer. They use halogen bulbs which produce a very intense and hot light from a small bulb, typically about a half-inch in length and located in a reflector housed within the body of the lamp, the reflector being generally about an inch and a half in diameter.

These small lamps are frequently used in crowded, dark places which need a small light source such as bookshelves, cabinets, and the like. A shield for the lamps can protect from the effects of halogen bulb burn-out and will also be aesthetically attractive, easily removable, and will allow for ventilation between the reflector and the shield.

SUMMARY OF THE INVENTION

Thus, it is the purpose of this invention to provide a shield for a small lamp, the lamp having a housing comprised of a circular base, side walls, and a perimeter member integral with the side walls, the housing having a reflector and bulb on the interior surface thereof, the housing also having a receipt means therein for attachment of the shield.

It is a further object of the present invention to provide for a shield comprised of a ring-shaped cover with uprights projecting upward from the top surface of the cover and legs projecting downward form the lower surface of the cover, the uprights for engagement with a locking ring, to hold between the locking ring and the uprights a glass member, the legs for holding the locking ring, glass member, and cover to the housing of the lamp.

DETAILED DESCRIPTION OF THE PREFERRED EMBODIMENT

Figure 1:
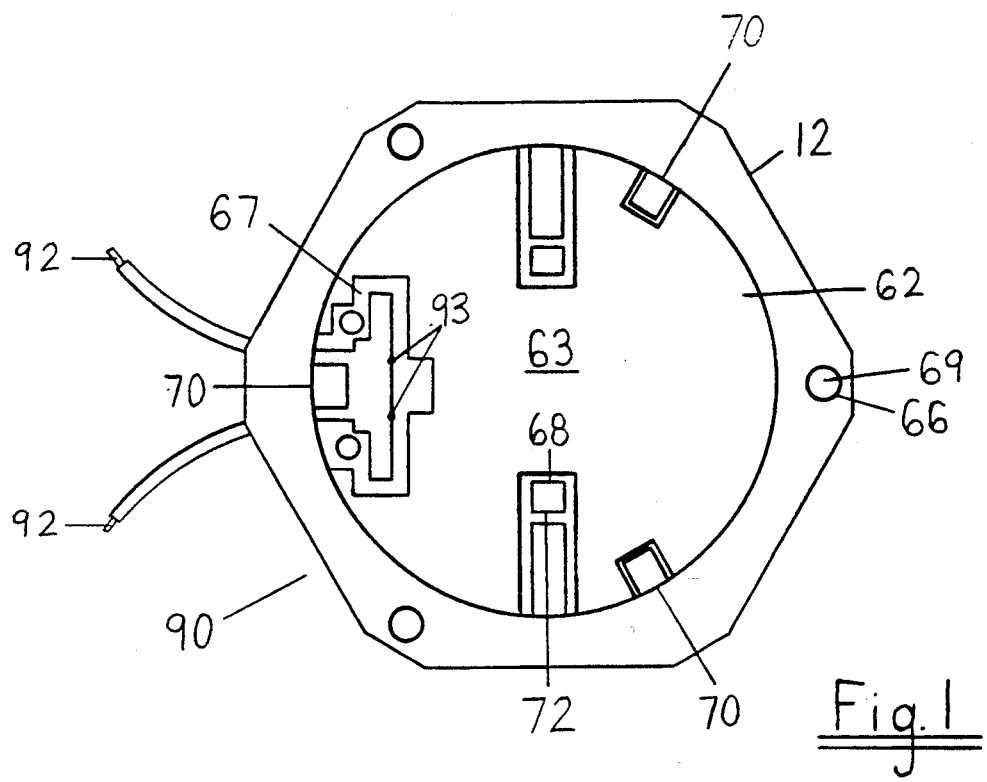
FIG. 1 is an elevational view of the top of the housing of the light, with the reflector and shield removed.
Figure 2:
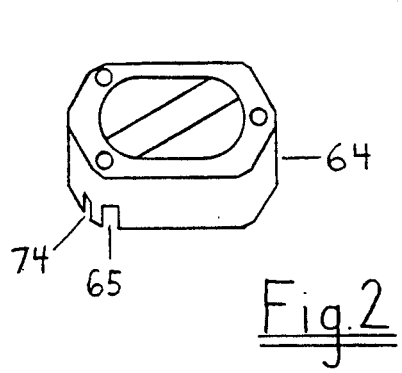
FIG. 2 is a perspective view of the housing of the lamp without the reflector or shield.

FIGS. 1 and 2 illustrate the housing (12) of the lamp of the present invention.

Figure 3:
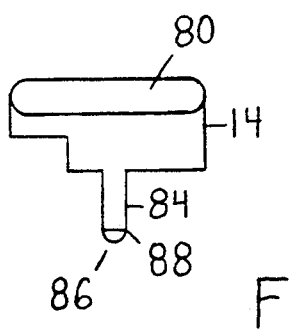
FIG. 3 is a perspective view of the reflector of the lamp.
Figure 4:
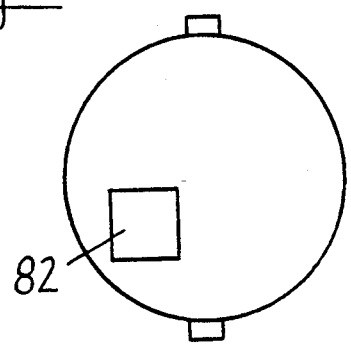
FIG. 4 is a top elevational view of the reflector of the lamp.

FIGS. 3 and 4 illustrate reflector (14) designed to fit within the interior of housing (12), as will be further detailed hereinbelow.

Figure 5:
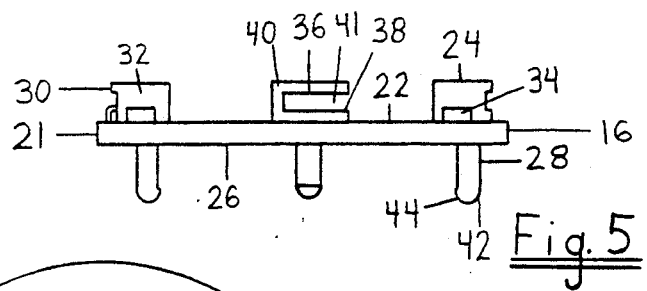
FIG. 5 is an elevational side view of the ring cover of the shield.
Figure 6:
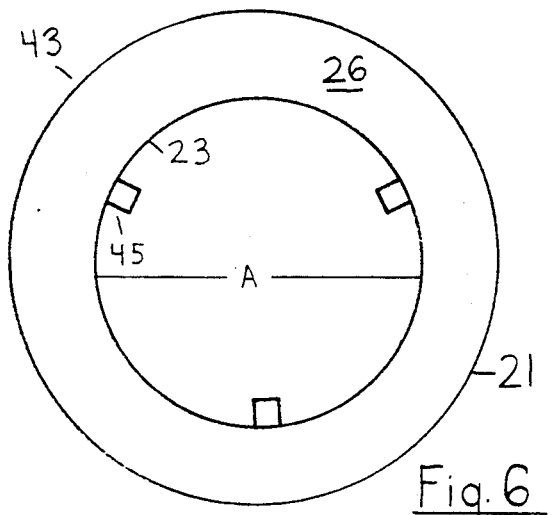
FIG. 6 is an elevational bottom view of the ring cover of the shield.
Figure 7:
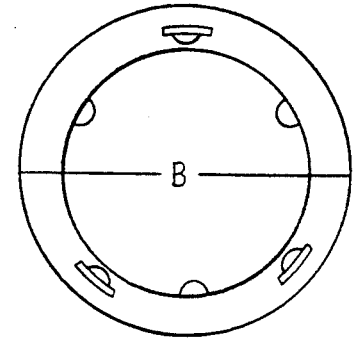
FIGS. 7 and 7A are an elevational top view of the ring cover of the shield and side view of the glass, respectively.

FIGS. 5, 6 and 7 illustrate various views of ring cover (16) of the present invention.

Figure 7A:
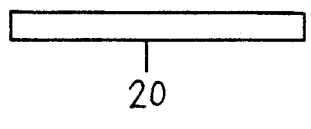

FIG. 7A illustrates glass (20).

FIGS. 8, 9, 10, and 11 all illustrate various views of locking ring (18) of the present invention.

As the specifications more further set forth below, housing (12) is adapted to receive ring cover (16) thereon. Ring cover (16) is adapted to receive glass (20) thereon, which is held in place to ring cover (16) with locking ring (18). Thus glass (20) is sandwiched between ring cover (16) and locking ring (18).

Turning now to FIGS. 5, 6, and 7, it can be seen that ring cover (16) is circular with an inner diameter (A) at inner perimeter (23) and has top surface (22) with uprights (24) extending generally vertical therefrom. Outer perimeter (21) defines an outer diameter B. Ring cover (16) has a bottom surface (26) with legs (28) extending vertically downward therefrom.

In the preferred embodiment, there are three uprights (24) and three legs (28).

As is further illustrated in FIGS. 5, 6, and 7, uprights (24) have an outer surface (30) and an inner surface (32) and standoffs (34) integral with top surface (22) and lying at the base of inner surface (32). Outer surface (30) of uprights (24) defines channel (36) with an open end (38) and closed end (40). Channel (36) has inner face (41). As can be seen in FIG. 6, outer perimeter (21) is integral with downward protruding outer lip (43), and inner perimeter (23) is integral with downward protruding inner lip (45). Thus, bottom surface (26) is essentially a broad channel between outer lip (43) and inner lip (45). Dimensions of the channel are such that bottom surface (26) of ring cover (16) will fit flush against perimeter (66) of housing (12) with lips (43) and (45) overlapping the outer and inner edges of perimeter (66) respectively.

Top surface (22), on the other hand, is—with the exception of standoffs (34) and uprights (24)—generally flat, or slightly canted upward (going from outer perimeter towards inner perimeter). Standoffs (34) provide means for glass (20) to rest, such that the underside of glass (20) is off top surface (22) of ring cover (16), generally about ⅛ inch. This allows for ventilation between the bulb and glass (20), but prevents the bulb from being touched.

FIGS. 8, 9, 10 and 11 all illustrate various views of locking ring (18). As will be further appreciated upon reading the description that follows, locking ring (18) provides a simple method of retaining glass (20) to ring cover (16) by engagement of boss means (47) on inner surface (46) of locking ring (18) to uprights (24). Specifically, locking ring (18) has inner surface (46) with generally rectangular boss means (47) integral therewith, boss means (47) projecting outward and upward from locking ring lower edge (54). Locking ring (18) is, of course, ring shaped and dimensioned to have an inner diameter approximately equal to or slightly less than the inner diameter of cover (16) and outer diameter will be approximately equal to or slightly less than the outer diameter of ring cover (16).

Figure 9:
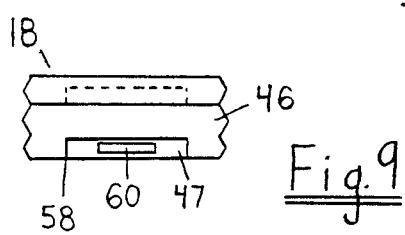
FIG. 9 is an elevational view of a section of the inside surface of the locking ring of the shield.
Figure 8:
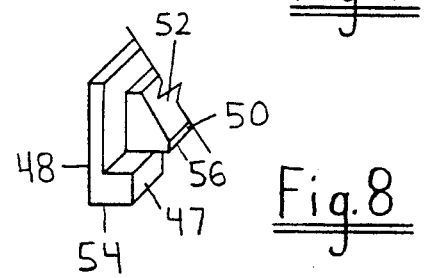
FIG. 8 is a perspective view in cross-section of a portion of the locking ring member of the shield.
Figure 10:
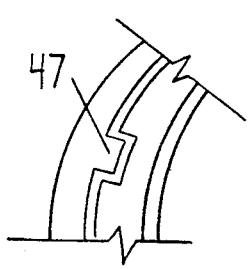
FIG. 10 is a bottom elevational view of a section of the locking ring of the shield.
Figure 11:
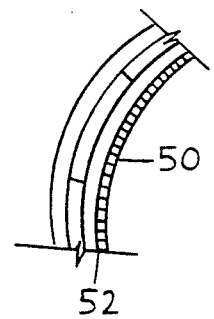
FIG. 11 is a top elevational view of a section of the locking ring of the shield.

Turning back to the structure of locking ring (18), FIG. 9 illustrates boss means (47) with boss means, leading edge (58) and ridge means (60) projecting from boss means (47). FIGS. 8 and 10 provide other views of boss means (47). FIG. 8, in addition, provides a view of outer surface (48) from which it can be appreciated that the height of locking ring (18) is greater than the width (or thickness). It can also be appreciated from FIGS. 8 and 11 that the locking ring is comprised of bezel (50) with beveled shoulder (52) and bezel lower edge (56). Bezel lower edge (56) will be flush against the top surface of glass (20) when locking ring (18) is in place on uprights (24).

Taking FIGS. 5 through 11 as a whole, it will be seen that glass (20) is placed on standoffs (34) then held in place laterally by uprights (24). Locking ring (18) is placed over uprights (24) such that bezel lower edge (56) lies flush against the top side of glass (20). Locking ring (18) is rotated until boss means leading edge (58) contacts open end (38) of channel (36) of inner surface (32) of upright (34). Continue the rotation for the boss means (47) into similarly dimensioned channel (36) while ridge means (60) engages inner face (41), providing a snug friction tight fit, until boss means leading edge abuts closed ends (40).

Thus it be seen from FIGS. 5 through 11 how ring cover (16) and locking ring (18) provide a means to hold glass (20) snugly to provide a shield for a small lamp.

FIGS. 1 and 2 illustrate the structure of housing (12) and how it is readily adapted to the shield of the present invention. More specifically, housing (12) has base (62), side wall (64) perimeter (66) thereon. Screw holes (69) are located in perimeter (66) to hold the lamp to a surface, such as the underside of a wood shelf. Upper surface (63) of base (62) has receipt means ring cover (70), and receipt means reflector (70) molded therein. As can be seen in FIG. 2, lower surface (65) of base (62) is flat, with access slots (74) along side wall (64) allowing access to locking means of the shield, legs (28) as well as for legs (84) of reflector (14).

FIG. 3 illustrates reflector (14) showing legs (84) with foot (86) at the removed end thereof. Foot (86) has lip (88) defining an upper ridge along foot (86). As can be seen in FIG. 4, there are preferably two feet (86) for reflector (14). There may be more, of course. The two feet (84) of reflector (14) fit in reflector receipt means (68) of base (62). Feet (84) and receipt means reflector (68) are dimensioned such that lip (88) of foot (86) engages locking lip (72) of receipt means reflector (68).

Likewise, as can be seen in FIGS. 1 and 5, foot (42) of ring cover (16) at removed end of legs (28) has lip (44) defining an upper ridge thereon. In the same manner as previously described, legs (28) of ring cover (16) fit in ring cover receipt means (70) of base.

Completing FIG. 1, it can be seen that mounting plate (67) carries ceramic thermal insulator block (90) thereon, with two wires (92) engageable at prong holes (93) with prongs of halogen bulb (not shown) coming off block (90) to engage a step-down transformer, preferably supplying 12 volts to the halogen bulb (not shown), which inserts to reflector at the ballast to bulb port (82) (FIG. 4) of reflector ball (80).

Last, it can be appreciated that legs (28) and (84) are constructed of a resilient or flexible material so as to bend while lips (44) and (88) pass locking lips (72). Thus, flexion of the legs against locking legs (28) and (84) with lips (44) and (88) resting on lower surface (65) in access slots (74) will hold both the reflector and the cover in place. Access slots (74) allow the user to place a blunt device against feet (42) and (86) and flex leg (28) and (84) away from locking lips (72) while pulling tension on the base, thus disengaging the base from the cover and/or the reflector.

Thus it can be seen how a small lamp is provided with a low profile, uniquely shaped base which is capable of engaging a reflector without the use of tools. Likewise, a unique shield is designed to engage and disengage the housing of the lamp in a manner which provides for a cover which overlays the housing of the lamp, provides support for a glass which may be held off the surface of the base, and provides a locking ring with a bezel shaped surface to mechanically engage the cover to produce an easily removable shield. Thus, the invention provides a small lamp made from three subcomponents, all of which nonmechanically engage and disengage to form a small, compact, light-weight unit with a protective shield. Subunits are the base, the reflector, and the shield. The shield is made up of three components which nonmechanically engage to provide a cover for the lamp which is both aesthetically pleasing and provides protection while allowing proper ventilation to the bulb of the lamp.

Terms such as "left," "right," "up," "down," "bottom," "top," "back," "out," and like are applicable to the embodiments shown and described in conjunction with the drawings. These terms are merely for purposes of description and do not necessarily apply to the position or manner in which the invention may be constructed for use.

Although the invention has been described in connection with the preferred embodiment, it is not intended to limit the invention's particular form set forth, but on the contrary, it is intended to cover such alternatives, modifications, and equivalences that may be included in the spirit and scope of the invention as defined by the appended claims.

I claim:

1. A shield for a lamp, the lamp having a housing comprised of a circular base, side walls, and perimeter member integral with the side walls, the housing having a reflector and bulb on the interior thereof, the housing further having receipt means therein for adaption to and receipt of the shield, the shield comprising:

cover means, said cover means being ring shaped with a top surface and a bottom surface thereon, said cover means defining an opening, said cover means having standoffs on the top surface thereof, said cover means for covering the perimeter member of the housing;

uprights, said uprights extending vertically upward from the top surface of said cover means, said uprights having a means for locking thereon;

legs, said legs being flexible and extending vertically downward from the bottom surface of said cover means, said legs having engagement means on the removed end thereof, for removable engagement with receipt means of the housing;

transparent member dimensioned resting on the standoffs of said cover means; and locking ring for lockingly engaging the locking means of said uprights to thereby hold said transparent means against the standoffs of said cover means, and to hold said lock ring to said uprights.

2. The device of claim 1 wherein the standoffs of said cover means are integral with said uprights.

3. The device of claim 1 wherein the uprights have an inner and an outer surface thereon, the outer surface defining a channel therein and wherein the lock ring has an inner and an outer surface, the inner surface thereof defining boss means, dimensioned for receipt snugly within the channel of said uprights, the channel thereby providing the means for locking to the boss means of said lock ring for holding said lock ring to said uprights.

4. The device of claim 1 wherein the engagement means of said legs are comprised of a wedge dimensioned to slidably engage the receipt means of the housing of the lamp.

5. The device of claim 3 wherein the channel of the outer surface of said uprights is open at a first end and closed at a second end and wherein the boss means of the inner surface of said lock ring is dimensioned to slide into the open end and seat snugly within the channel upon placement of said lock ring over said cover and said transparent member, upon rotation of said lock ring.

6. The device of claim 5 wherein the standoffs of said cover and the locking ring are dimensioned to allow for a gap between the top surface of said cover and said transparent member, thereby allowing the circulation of air over the bulb of the lamp.

7. The device of claim 1 wherein the standoffs of said cover means are integral with said uprights and wherein the standoffs of said cover and the locking ring are dimensioned to allow for a gap between the top surface of said cover and the bottom surface of said transparent member, thereby allowing the circulation of air over the bulb of the lamp.

8. The device of claim 7 wherein the uprights have an inner and an outer surface thereon, the outer surface defining a channel therein and wherein the lock ring has an inner and an outer surface, the inner surface thereof defining boss means, the boss means dimensioned for receipt snugly within the channel of said uprights, the channel thereby providing the means for locking to the boss means of said lock ring thereby holding said lock ring to said uprights.

9. The device of claim 8 wherein the engagement means of said legs are comprised of a wedge dimensioned to slidably engage the receipt means of the housing of the lamp.

10. A shield for a lamp, the lamp having a housing comprised of a circular base, side walls, and perimeter member integral with the side walls, the housing having a reflector and bulb on the interior thereof, the housing further having receipt means therein for adaption to and receipt of the shield, the shield comprising:

cover means, said cover means being ring shaped at the top surface and a bottom surface thereon, the cover means defining an opening, said cover means having stand-offs on the top surface thereof, said cover means for covering the perimeter member of the housing;

uprights, said uprights extending vertically upright from the top surface of said cover means, said uprights having a means for locking thereon, said uprights having standoffs integral at the base thereof;

legs, said legs being flexible and extending vertically downward from the bottom surface of said cover means, said legs having an engagement means on the removed end thereof, for a removable engagement with receipt means of the housing;

transparent member for substantially covering the opening of said cover means, the transparent member resting on the standoffs of said cover means; and lock ring for lockingly engaging the lock means of said uprights to thereby hold said transparent means against the standoffs of said cover means, to hold said lock ring to said uprights;

wherein the standoffs of said cover and the locking ring are dimensioned to allow for a gap between the top surface of said cover and said transparent member, thereby allowing the circulation of air over the bulb of the lamp.

* * * * *